Figure 1:
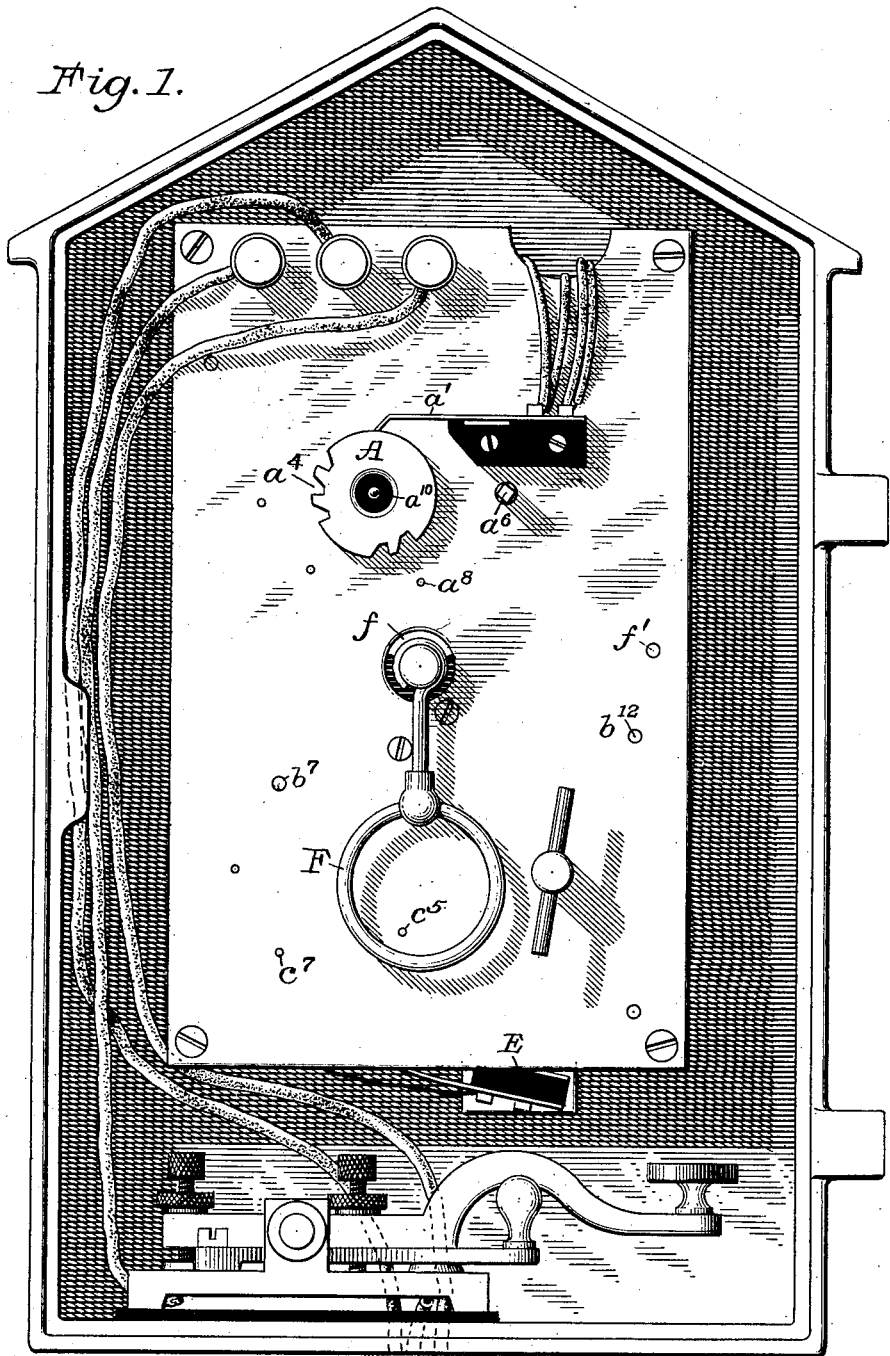

No. 760,955. PATENTED MAY 24, 1904.
R. G. CALLUM.
ELECTRIC SIGNALING SYSTEM AND APPARATUS EMPLOYED THEREIN.
APPLICATION FILED OCT. 11, 1902.
NO MODEL. 3 SHEETS—SHEET 1.

Attest:
T. W. Fowler
C. A. Neale

Inventor:
Robert G. Callum
By Howell Battle
Attorney.

No. 760,955. PATENTED MAY 24, 1904.
R. G. CALLUM.
ELECTRIC SIGNALING SYSTEM AND APPARATUS EMPLOYED THEREIN.
APPLICATION FILED OCT. 11, 1902.
NO MODEL. 3 SHEETS—SHEET 2.
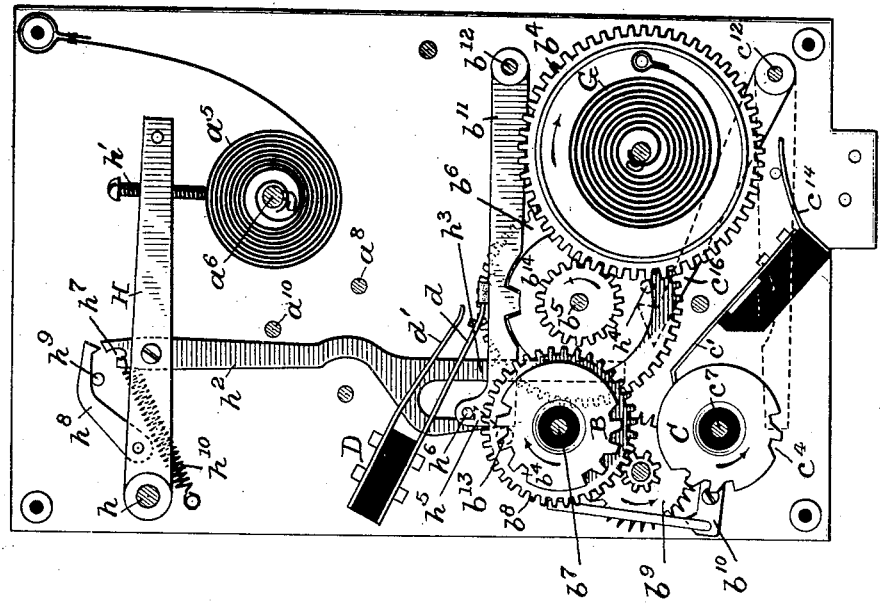
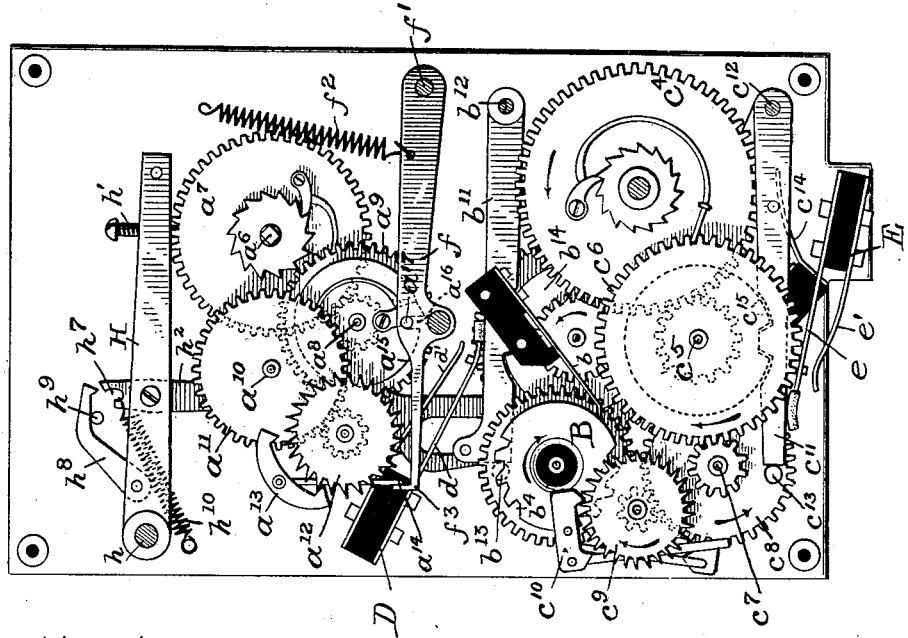
Attest:
T. W. Fowler
C. A. Neate
Inventor:
Robert G. Callum,
By Howell Zantle
Attorney.

No. 760,955. PATENTED MAY 24, 1904.
R. G. CALLUM.
ELECTRIC SIGNALING SYSTEM AND APPARATUS EMPLOYED THEREIN.
APPLICATION FILED OCT. 11, 1902.
NO MODEL. 3 SHEETS—SHEET 3.

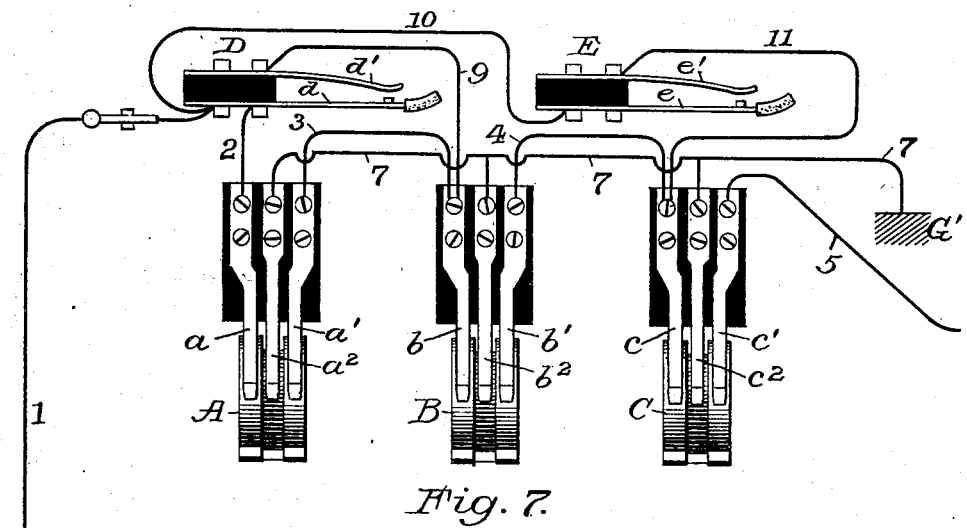
*Fig. 7.*
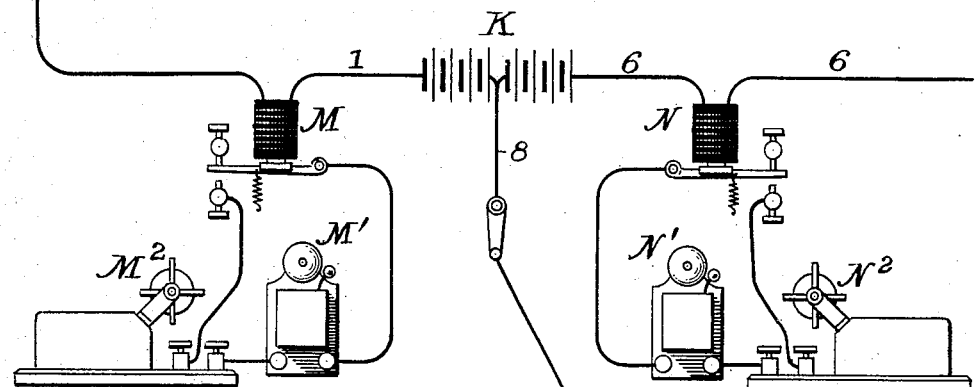
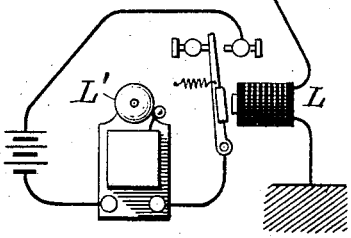
Attest:
T. W. Fowler
C. H. Neal
Inventor:
Robert G. Callum
By Howell Buttle
Attorney.

No. 760,955.                                                                 Patented May 24, 1904.

UNITED STATES PATENT OFFICE.

ROBERT G. CALLUM, OF WASHINGTON, DISTRICT OF COLUMBIA.

ELECTRIC SIGNALING SYSTEM AND APPARATUS EMPLOYED THEREIN.

SPECIFICATION forming part of Letters Patent No. 760,955, dated May 24, 1904.

Application filed October 11, 1902. Serial No. 126,899. (No model.)

*To all whom it may concern:*

Be it known that I, ROBERT G. CALLUM, a citizen of the United States, residing at Washington, in the District of Columbia, have invented new and useful Improvements in Electric Signaling Systems and Apparatus Employed Therein, of which the following is a specification.

My invention relates to electric signaling systems in which a spring-operated mechanism is relied upon for the transmission of signals to a central station from points more or less remote therefrom, and has been devised with special reference to systems employed for the transmission of fire or burglar alarms, its main features being applicable to such systems as are automatic in character, as well as to systems designed for manual operation.

In systems where the signal is transmitted by a spring-operated instrument or mechanism—as, for instance, the fire-alarm systems now in general use—great loss of property may be and sometimes is occasioned by the failure of a signaling instrument or alarm-box to operate in time of emergency, and this failure is generally due to one of two causes—viz., the breakage of the operating-spring, which may be due to sudden changes in temperature, or a failure to rewind the instrument after it has run down from repeated operations.

The main object of my invention is to provide means for automatically notifying the central office of the breakage of a spring in any of the signaling instruments or the fact that a particular instrument requires rewinding, the notification being such as to indicate the particular instrument requiring attention.

I have embodied the main features of my invention in a system which will not be rendered inoperative by the breakage or grounding of a line-wire or by the short-circuiting of a signaling instrument, and I have also devised a novel signaling instrument which may be installed in existing systems for carrying out the main objects of my invention.

After a detail description of my invention, as illustrated in the accompanying drawings, the features deemed novel will be specified in the claims hereunto annexed.

Figure 4:
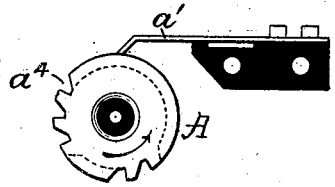
Figure 5:
Figure 6:

Referring to the drawings, Figure 1 illustrates the interior of a fire-alarm box containing a signaling instrument constructed in accordance with my invention. Fig. 2 illustrates said instrument with the front frame-plate removed. Fig. 3 is a similar view, but with a portion of the mechanism removed. Figs. 4, 5, and 6 are detail views of one of the circuit-breaking wheels and its brushes, and Fig. 7 is a diagrammatic view of a complete system embodying my invention.

I have illustrated my invention as applied to a manual fire-alarm system; but it is to be understood that it may be applied to any electric signaling system in which spring-operated signaling instruments are employed regardless of whether the system be designed for manual or for automatic operation.

In Fig. 1 I show a fire-alarm box or instrument which is operated for giving an alarm by pulling down a ring or pull F, which releases the spring-operated mechanism for driving a circuit-breaking wheel A, the latter operating to break an electric circuit for indicating at the central station a number corresponding to that given to the particular box or instrument, as is common in systems of this character. In all systems employing spring-operated signaling instruments it is necessary that said instruments be frequently inspected to see that the operating-springs are properly wound up and also to guard against an instrument remaining for any considerable time in inoperative condition because of the breakage of a spring, which is liable to occur from sudden changes in temperature. To obviate the necessity of frequent inspection, I have organized an auxiliary mechanism which automatically notifies the central office of the breakage of a spring in any of the signaling instruments or of the fact that a particular instrument requires rewinding, the warning-signal being given, together with the number of the particular instrument giving the warning-signal. The mechanism employed for this purpose is set in motion by expansion of the mainspring beyond a predetermined point, whether such expansion be due to the breakage of the spring or to repeated operations of the signaling instrument. Said mechanism when set in motion transmits two signals, the first signifying an expansion of the spring, which may be due to either of the causes named, and the second being the number of the box requiring attention. The first of these signals I term the "trouble-signal," and this should be the same in all of the instruments in the system, and no instrument should be given an alarm-number that might be confused therewith. For instance, if "44" be selected for the trouble-signal no instrument should be given an alarm-number including the numeral "4."

As before indicated, the alarm-signal is transmitted by the circuit-breaking wheel A, said wheel being notched, as at $a^4$, for breaking a current passing therethrough by way of coöperating brushes in the usual manner. The wheel A is rotated by a spring $a^5$, (shown in Fig. 3,) which is arranged in a well-known manner for driving a shaft $a^6$, upon which is mounted a gear $a^7$, the latter meshing with a pinion on a shaft $a^8$, which carries a gear $a^9$ for driving the shaft $a^{10}$, upon which the circuit-breaking wheel A is mounted. Shaft $a^{10}$ also carries a gear $a^{11}$ for driving an escapement-wheel $a^{12}$, which with a pallet $a^{13}$ serves to retard the rotation of the wheel A, as will be understood. This driving mechanism for wheel A is held normally at rest by a lever $f$, which is pivoted to the supporting-frame, as at $f'$, and held by a spring $f^2$, so that its free end $f^3$ will be normally in engagement with or in the path of an arm $a^{14}$, attached to the pallet $a^{13}$, the latter being thereby prevented from vibrating. Attached to the lever $f$ is the ring or pull F, before referred to. When an alarm is to be given, lever $f$ is lowered by means of the pull F, so that its free end will be out of the path of the arm $a^{14}$ and the pallet $a^{13}$ free to vibrate.

Mounted on the shaft $a^8$ is a concentric cam $a^{15}$, provided with a slot $a^{16}$, and lever $f$ is provided with a pin $a^{17}$, which normally occupies said slot. When lever $f$ is lowered and the mechanism set in motion, pin $a^{17}$ is withdrawn from the slot $a^{16}$, and the latter is carried by the rotation of shaft $a^8$ past the path of the pin, so that lever $f$ will be prevented from returning to its normal position until the circuit-breaking wheel A has made a predetermined number of revolutions or until the slot $a^{16}$ is again opposite the pin $a^{17}$, the lever being then permitted to return to its normal position for stopping the mechanism, the latter as thus far described being of well-known construction.

The auxiliary mechanism which I have devised for automatically sending in a trouble-signal signifying a breakage of the spring $a^5$ or that said spring requires rewinding consists of two circuit-breaking wheels B and C and their controlling mechanism. Wheel B is notched for giving a signal "44," indicating trouble with spring $a^5$, and wheel C is notched to give the same signal as wheel A, indicating the number of the particular instrument, which in this case is "23."

The circuit-breaking wheels B and C are driven by a spring G, common to both wheels, and said spring is therefore mounted in a well-known manner for oppositely and independently driving two gears $b^4$ and $c^4$. The gear $b^4$ meshes with a pinion on a shaft $b^5$, and on the latter is a gear $b^6$, which drives the shaft $b^7$, upon which wheel B is mounted. On said shaft $b^7$ is a gear $b^8$, which meshes with a pinion on a shaft carrying an escapement-wheel $b^9$, the latter, with a pallet $b^{10}$, serving to retard the rotation of wheel B in the usual manner.

The gearing for driving the circuit-breaking wheel C is a duplicate of that just described. The gear $c^4$ drives the shaft $c^5$, and the latter through the gear $c^6$ drives the shaft $c^7$, carrying the wheel C, and on said shaft $c^7$ is a gear $c^8$, which meshes with a pinion on a shaft carrying an escapement-wheel $c^9$, which coöperates with a pallet $c^{10}$ for retarding the rotation of circuit-breaking wheel C.

The mechanism for rotating wheel B is normally held in check by a lever $b^{11}$, which is pivoted to the supporting-frame, as at $b^{12}$, and having its free end normally in the path of a pin $b^{13}$ on the gear $b^8$. (Shown in dotted lines in Figs. 2 and 3.) Said lever is held to its normal position by the spring-contact $d$ of the circuit-closing device D, to be hereinafter referred to. When said lever is raised out of the path of the pin $b^{13}$, the gearing is free to revolve, and the releasing-lever is prevented by a cam $b^{14}$ from returning to its normal position and stopping the mechanism until the circuit-breaking wheel B has made a predetermined number of revolutions, as will be readily understood.

The mechanism for rotating the circuit-breaking wheel C is held in check by a similar lever $c^{11}$, which is mounted on a shaft $c^{12}$ and which has its free end normally in the path of a pin $c^{13}$ on the gear $c^8$. Said lever is held to its normal position by a spring $c^{14}$, and when lowered for releasing the mechanism said lever is prevented from immediately returning to its normal position by a cam $c^{15}$ (shown in dotted lines in Fig. 2,) as before described in connection with the lever $b^{11}$.

Above the main signaling mechanism is a lever H, pivoted, as at $h$, and carrying at its outer end a screw $h'$, which rests upon the mainspring $a^5$, the free end of said lever being thus supported by said spring and said screw serving as a means of adjustment, to be presently explained. Pivoted to said lever is an arm $h^2$, having its lower end $h^3$ in the path of a pin $h^4$ on the gear $b^6$ of the auxiliary mechanism, said pin being shown in dotted lines in Fig. 3. Arm $h^2$ carries a hook $h^5$, which engages a pin $h^6$ on the releasing-lever $b^{11}$. It will now be seen that as the mainspring $a^5$ expands in operating the alarm mechanism the free end of lever H will be raised and carry with it the arm $h^2$ and that when said arm has been raised a sufficient distance the hook $h^5$ will cause lever $b^{11}$ to be raised, and thereby release the mechanism for revolving the circuit-breaking wheel B. As the latter mechanism revolves, pin $h^4$ on the gear $b^6$ will push the lower end of arm $h^2$, so that hook $h^5$ will be moved from beneath the pin $h^6$, lever $b^{11}$ being then free to return to its normal position at the proper time for stopping the rotation of wheel B. Just prior to the moment the rotation of wheel B ceases pin $h^4$ pushes down on a lever or arm $c^{16}$, which is fixed on the shaft $c^{12}$, on which is also fixed the releasing-lever $c^{11}$, controlling the rotation of circuit-breaking wheel C. This movement of arm $c^{16}$ causes the releasing-lever $c^{11}$ to be moved for starting the mechanism controlling the wheel C, and the signal transmitted by the latter will therefore follow a signal given by the wheel B. When the auxiliary mechanism has been operated by an expansion of the spring $a^5$, as described, the lever H will remain in its elevated position until said spring is rewound, when it will gradually descend as said spring is contracted. During the descent of lever H the hook $h^5$ must be in a position to pass the pin $h^6$ on the releasing-lever $b^{11}$, and must therefore be held to the position to which it was moved by the pin $h^4$. For this purpose the upper end of arm $h^2$ projects above the lever H and is provided with a notch $h^7$, and pivotally mounted on said lever is a pawl $h^8$, which when said lever is in its normal position rests upon a fixed pin $h^9$, and is thereby held above the projecting end of arm $h^2$. When lever H is raised for releasing the auxiliary mechanism, the upper end of arm $h^2$ contacts with and raises the pawl $h^8$, and when arm $h^2$ is moved by the pin $h^4$ on the gear $b^6$ the pawl $h^8$ drops into the notch $h^7$ and holds said arm in its retracted position. When lever H is lowered, as by rewinding the spring $a^5$, the hook $h^5$ is thus held in a position to pass the pin $h^6$, and thereafter as lever H continues to descend the descent of pawl $h^8$ is arrested by the fixed pin $h^9$ for releasing it from engagement with arm $h^2$, and the latter is returned to its normal position, with the hook $h^5$ beneath the pin $h^6$, by a spring $h^{10}$.

The main alarm mechanism should be capable of a number of operations before the mainspring expands sufficiently to release the auxiliary mechanism, and the screw $h'$ on lever H, before referred to, is utilized for adjusting the time of operation of the auxiliary mechanism with respect to the main alarm mechanism. This adjustment is of importance in order that the auxiliary mechanism may be prevented from interfering with a proper transmission of an alarm-signal and also to insure an operation of the auxiliary mechanism immediately succeeding the last alarm that is to given by the main mechanism before the mainspring is rewound.

As before stated, the auxiliary mechanism is to notify the central station of the fact that the mainspring requires rewinding or that said spring is broken, it being obvious that a breakage and consequent expansion of the spring will cause the auxiliary mechanism to be set in motion in the same manner as when said spring is expanded from repeated operations of the alarm mechanism.

The circuit-breaking wheels A, B, and C are normally in a circuit which includes all of the signaling instruments in the system, as well as the signal receiving or recording instruments at the central station. Wheel A is, however, cut out of the circuit during the transmission of a trouble-signal by the wheel B, and the latter is cut out of the circuit during the transmission of a signal by the wheel C, this being done to prevent a possible confusion of signals and also to guard against the possibility of the circuit being left open by the accidental stoppage of one of the wheels in a position which would leave its cooperating brushes opposite a notch in the wheel.

Circuit-breaking wheel A is cut out of the circuit during the operation of wheel B by a circuit-closing device D, consisting of two spring-contacts $d$ and $d'$, the former resting against the lever $b^{11}$ in proper position to be moved thereby into engagement with the contact $d'$ when said lever is raised for releasing the mechanism controlling wheel B. When the rotation of wheel B ceases and wheel C is set in motion, wheels A and B are both cut out of the circuit by the circuit-closer E, which also consists of two spring-contacts $e$ and $e'$, the former being arranged to be pressed against the latter by the lever $c^{11}$, which controls the operation of wheel C, as clearly shown in Fig. 2.

Now while it is to be understood that a signaling instrument embodying the features above described may be adapted for use in any system in which a spring-operated signaling instrument is employed the particular instrument illustrated has been devised for use in the system illustrated in Fig. 7. Each of the circuit-breaking wheels A, B, and C are therefore constructed as illustrated in Figs. 4, 5, and 6, and with each wheel there are three contact-brushes, two of which are connected in the main circuit for normally maintaining said wheels in closed circuit with all of the signaling instruments in the system and with the signal receiving and recording instruments at the central office. The third brush of each of the circuit-breaking wheels is arranged to establish a temporary ground connection during the transmission of a signal, the object being to insure the proper transmission and receipt of a signal in case the line-wire be accidentally broken or grounded or the signaling instrument be short-circuited, as by a crossing of wires.

As shown in Figs. 4, 5, and 6, the wheel A is insulated from its supporting-shaft and is provided with a groove $a^3$ opposite the brush $a^2$, so that the latter is normally out of contact with said wheel. The brushes $a$ and $a'$ are normally in the main-line circuit and rest upon said wheel at each side of the groove $a^3$, so that current may pass from brush $a$ to brush $a'$ through said wheel. As the wheel is revolved the current is interrupted by the notches $a^4$ for giving the signal, and just prior to each interruption the wheel makes contact with the brush $a^2$ for establishing the temporary ground connection before referred to. As before stated, the three wheels A, B, and C are similar in structure, and each is provided with the three brushes, as just described.

Referring to Fig. 7, the line-wire 1 from the battery K at the central station connects with contact $d$ of the circuit-closer D, the current passing therefrom by way of a wire 2 to the brush $a$ and thence through the circuit-breaking wheel A to brush $a'$, through wire 3 to brush $b$, resting on wheel B, thence through brush $b'$ and wire 4 to the brush $c$, resting on the wheel C, through brush $c'$ and wire 5 to the other signaling instruments in the system, and back to battery through wire 6. The brushes $a^2$, $b^2$, and $c^2$ are each connected to a wire 7, leading to ground G'.

The battery K is divided by a wire 8, leading to ground $G^2$, and in said wire is a normally open relay controlling a normally open local circuit for operating a bell L', this relay and bell being provided for indicating the presence of an accidental ground in the main-line wires. In the wire 1 there is a relay M, controlling a local circuit for operating a tap-bell M' and a recorder $M^2$, and in the line-wire 6 is a relay N, controlling a local circuit for operating a tap-bell N' and recorder $N^2$, these relays, bells, and recorders being arranged in a well-known manner for receiving and recording the signals from the signaling instruments, as will be readily understood.

It will now be seen that when the circuit-breaking wheel A is operated for sending in an alarm signals will be received on the two sets of receiving and recording instruments over the normally closed circuit, which includes the battery K, wire 1, contact $d$, wire 2, brush $a$, circuit-breaking wheel A, brush $a'$, wire 3, brush $b$, wire 4, brush $c$, circuit-breaking wheel C, and wires 5 and 6. Should the wire 1 be broken or grounded, the signal will be received on the receiving and recording instruments at the right of the battery K over the temporary ground-circuit, which will be established by the brush $a^2$ as follows: From the right-hand portion of the battery the current will pass over wire 8 to ground $G^2$, thence over wire 7 to brush $a^2$, then over wheel A, brush $a'$, wire 3, brush $b$, wheel B, brush $b'$, wire 4, brush $c$, wheel C, wire 5, and back to battery over wire 6. Should the line-wires 5 or 6 be broken or grounded, the signal will be received and recorded on the instruments at the left of the battery over the temporary ground-circuit established by brush $a^2$ as follows: From the left-hand portion of the battery K the current will pass over wire 1 to the contact $d$, thence over wire 2, brush $a$, wheel A, and brush $a^2$ to ground G' by way of wire 7, thence back to battery over wire 8.

When the circuit-breaking wheel B is operated for notifying the central office that the mainspring of the instrument is broken or requires rewinding, wheel A is cut out of the circuit by the circuit-closer D, and the signal from wheel B is received over the normally closed main circuit or over a temporary ground-circuit in the same manner as the signals from wheel A, and when wheel C is operated wheels A and B are both cut out of the circuit by the circuit-closing device E, the signals from wheel C being received at the central office in precisely the same manner as the signals from wheels A and B.

As before described, when lever $b^{11}$ of the signal-transmitting instrument is raised for liberating the auxiliary mechanism it presses contact $d$ of the circuit-closer D against the contact $d'$. The circuit-breaking wheel A is then excluded from the circuit as follows: The current from battery K passes over wire 1 to the contacts $d$ and $d'$, then over wire 9 to the brush $b$ and wheel B, then over brush $b'$, wire 4, brush $c$, wheel C, and brush $c'$ back to battery by way of wires 5 and 6. Should either of the line-wires be broken or grounded, the signal will be transmitted by way of the temporary ground-circuit, which will be established by the brush $b^2$, over the other line-wire, as before explained in connection with the circuit-breaking wheel A. As the wheel C starts to rotate for transmitting its signal the contacts $d$ and $d'$ separate because of the return of lever $b^{11}$ to its normal position, and the contacts $e$ and $e'$ of the circuit-closer E are closed, as already explained. The current then passes over wire 1, contact $d$, and wire 10 to the contacts $e$ and $e'$, thence over wire 11 to brush $c$ and wheel C, over brush $c'$ and wires 5 and 6 back to battery. The brush $c^2$ establishes a temporary ground-circuit for insuring a transmission of the signal in case of a breakage or grounding of one of the line-wires, as before explained.

Having thus described my invention, what I claim as new, and desire to secure by Letters Patent, is—

1. In an electric signaling system, the combination with a spring-operated signaling instrument, of an auxiliary signaling mechanism having an independent motive power and adapted to be set in motion by an expansion beyond a predetermined point of the spring controlling the operation of said instrument, substantially as described.

2. In an electric signaling system the combination with a signal receiving or recording instrument, of a spring-operated signal-transmitting instrument in circuit therewith, and an auxiliary mechanism having an independent motive power and adapted to be set in motion by an expansion beyond a predetermined point of the spring of said transmitting instrument for transmitting a signal differing from the signal transmitted by said instrument, substantially as described.

3. In an electric signaling system, the combination with a signal receiving or recording instrument of a spring-operated signal-transmitting instrument in circuit therewith, and an auxiliary mechanism adapted to be set in motion by an expansion beyond a predetermined point of the driving-spring of said instrument, said auxiliary mechanism operating to short-circuit said instrument and transmit a signal over the main circuit, substantially as described.

4. In an electric signaling system, the combination of a normally closed electric circuit including signal receiving or recording instruments, of a spring-operated signal-transmitting instrument, and auxiliary mechanism adapted to be operated by an expansion beyond a predetermined point of the driving-spring of said instrument, said auxiliary mechanism operating to short-circuit said instrument and transmit a signal over the main circuit, substantially as described.

5. In an electric signaling system, a normally closed metallic circuit, a ground connection dividing the batteries thereof, a spring-operated signaling instrument normally in said circuit, said instrument being adapted to automatically ground said circuit and transmit a signal thereover at both sides of said ground, and an auxiliary mechanism adapted to be operated by an expansion beyond a predetermined point of the driving-spring of said instrument, said auxiliary mechanism operating to also ground the main circuit and transmit a signal thereover at both sides of said ground, substantially as described.

6. In an electric signaling system, a normally closed metallic circuit, a ground connection dividing the batteries thereof, a spring-operated signaling instrument normally in said circuit, said instrument being adapted to automatically ground said circuit and transmit a signal thereover at both sides of said ground, and an auxiliary mechanism adapted to be operated by an expansion beyond a predetermined point of the driving-spring of said instrument, said auxiliary mechanism operating to short-circuit said instrument, ground the main circuit and transmit a signal thereover at both sides of said ground, substantially as described.

7. In an electric signaling system, a normally closed metallic circuit, a spring-operated signal-transmitting instrument normally in said circuit, an auxiliary mechanism adapted to be operated by an expansion beyond a predetermined point of the driving-spring of said instrument, said auxiliary mechanism operating to short-circuit said instrument and transmit a signal over said circuit, substantially as described.

8. In an electric signaling system, a normally closed metallic circuit, a ground connection dividing the batteries thereof, a spring-operated signal-transmitting instrument normally in said circuit, an auxiliary mechanism adapted to be operated by an expansion beyond a predetermined point of the driving-spring of said instrument, said auxiliary mechanism operating to short-circuit said instrument and transmit over the main circuit successive signals differing from each other, substantially as described.

9. In an electric signaling instrument, the combination of a circuit-breaking wheel, spring mechanism for rotating said wheel, a second circuit-breaking wheel, mechanism for rotating said second wheel, means for holding said wheels normally at rest, and means operated by an expansion beyond a predetermined point of the driving-spring of the first-named mechanism for releasing the mechanism for rotating said second wheel, substantially as described.

10. In an electric signaling instrument, the combination of three circuit-breaking wheels, spring-driven mechanism for independently rotating said wheels, means for holding said wheels normally at rest, means operated by an expansion beyond a predetermined point of the spring for driving one of said wheels for releasing the mechanism controlling another of said wheels, and means operated by the mechanism controlling the said other wheel for releasing the mechanism controlling the third wheel, substantially as described.

11. In an electric signaling instrument, the combination of a circuit-breaking wheel, spring driving mechanism for said wheel, a second circuit-breaking wheel, mechanism for driving said second wheel, means for normally holding both wheels at rest, means operated by an expansion beyond a predetermined point of the spring of the first-mentioned mechanism for releasing the mechanism controlling the second wheel, and a circuit-closing device operated by the last-mentioned mechanism, substantially as described.

12. In an electric signaling instrument, the combination of a main circuit-breaking wheel, spring driving mechanism for said wheel, an auxiliary mechanism adapted to be set in motion by an expansion beyond a predetermined point of the driving-spring of said spring driving mechanism, a pair of circuit-breaking wheels adapted to be driven in succession by said auxiliary mechanism, and a pair of circuit-closing devices adapted to be successively operated in unison with the operations of the last-mentioned circuit-breaking wheels, substantially as described.

In testimony whereof I have hereunto set my hand in presence of two subscribing witnesses.

ROBERT G. CALLUM.

Witnesses:
J. W.-TAYLOR,
M. G. ANDERSON.